(12) United States Patent
Sy

(10) Patent No.: US 10,445,949 B2
(45) Date of Patent: Oct. 15, 2019

(54) PACKAGE DIMENSION MEASUREMENT SYSTEM

(71) Applicant: NCR Corporation, Duluth, GA (US)

(72) Inventor: Nico Ryan James Geguiera Sy, Pagadian (PH)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/689,410

(22) Filed: Aug. 29, 2017

(65) Prior Publication Data

US 2019/0066395 A1 Feb. 28, 2019

(51) Int. Cl.
*G07B 17/00* (2006.01)
*G06T 7/60* (2017.01)
*G06K 9/46* (2006.01)
*G06K 9/78* (2006.01)
*G06T 7/80* (2017.01)

(52) U.S. Cl.
CPC ......... *G07B 17/00661* (2013.01); *G06K 9/46* (2013.01); *G06K 9/468* (2013.01); *G06K 9/78* (2013.01); *G06T 7/60* (2013.01); *G06T 7/80* (2017.01); *G07B 17/00508* (2013.01); *G07B 2017/0037* (2013.01); *G07B 2017/00685* (2013.01)

(58) Field of Classification Search
None
See application file for complete search history.

(56) References Cited

U.S. PATENT DOCUMENTS

| | | | | |
|---|---|---|---|---|
| 5,469,262 A * | 11/1995 | Keen | ...................... | G01B 11/04 356/627 |
| 6,798,528 B1 * | 9/2004 | Hartman | ................ | G01B 11/04 356/625 |
| 8,688,579 B1 * | 4/2014 | Ethington | .......... | G06Q 20/0425 705/42 |
| 8,781,159 B2 * | 7/2014 | Sones | ...................... | G06K 9/00 235/440 |
| 9,292,969 B2 * | 3/2016 | Laffargue | ................ | G06T 17/20 |
| 9,762,793 B2 * | 9/2017 | Ackley | ............. | H04N 5/23222 |
| 9,818,235 B1 * | 11/2017 | Rotman | .................... | G06T 7/60 |
| 2013/0101158 A1 * | 4/2013 | Lloyd | ...................... | G06T 7/62 382/103 |
| 2013/0293539 A1 * | 11/2013 | Hunt | ..................... | G01B 11/00 345/420 |
| 2014/0104414 A1 * | 4/2014 | McCloskey | .......... | G06Q 10/083 348/135 |

(Continued)

OTHER PUBLICATIONS

W. Wang, Y. Tang, J. Hong and H. Fan, "Image Corner Detection Technique Research on Machine Vision," 2009 International Workshop on Intelligent Systems and Applications, Wuhan, 2009, pp. 1-4. (Year: 2009).*

(Continued)

*Primary Examiner* — Andrae S Allison
(74) *Attorney, Agent, or Firm* — Schwegman, Lundberg & Woessner

(57) ABSTRACT

Disclosed herein are systems and methods for measuring package dimensions. The systems and methods may include determining, by a computing device comprising a processor, pixel locations of a plurality of corners of a package within an image. The systems and methods may also include determining, by the computing device, the package dimensions based on the pixel locations.

13 Claims, 4 Drawing Sheets

(56) References Cited

U.S. PATENT DOCUMENTS

| | | | |
|---|---|---|---|
| 2014/0104416 A1* | 4/2014 | Giordano | G01B 11/02 |
| | | | 348/135 |
| 2015/0063676 A1* | 3/2015 | Lloyd | G01B 11/24 |
| | | | 382/141 |
| 2016/0155082 A1* | 6/2016 | Kieffer | G06Q 10/083 |
| | | | 705/330 |
| 2016/0358124 A1* | 12/2016 | Crane | G06Q 10/0836 |
| 2016/0370220 A1* | 12/2016 | Ackley | G01B 11/02 |
| 2017/0140550 A1* | 5/2017 | Zhang | G06T 7/50 |

OTHER PUBLICATIONS

Paula, Ialis C., et al. "Multiscale corner detection in planar shapes." Journal of mathematical imaging and vision 45.3 (2013): 251-263. (Year: 2013).*

Birchfield, Stan; An Introduction Projection Geometry, <http://robotics.stanford.edu/~birch/projective/projective.pdf>, 1998 (Year: 1998).*

* cited by examiner

PACKAGE DIMENSION MEASUREMENT SYSTEM

BACKGROUND

The costs for shipping a package vary depending on the size and weight of the package. For example, a large box that is very heavy may cost more to ship than a small box that is very light. In addition to size and weight, the distance the package has to travel and how fast the package needs to get to its destination can also effect the shipping cost. For example, shipping a letter overnight from across the country may be more expensive than shipping a small box to a neighboring town with no time constraints.

SUMMARY

Disclosed herein are systems and methods for measuring package dimensions. The systems and methods may include determining, by a computing device comprising a processor, pixel locations of a plurality of corners of a package within an image. The systems and methods may also include determining, by the computing device, the package dimensions based on the pixel locations.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
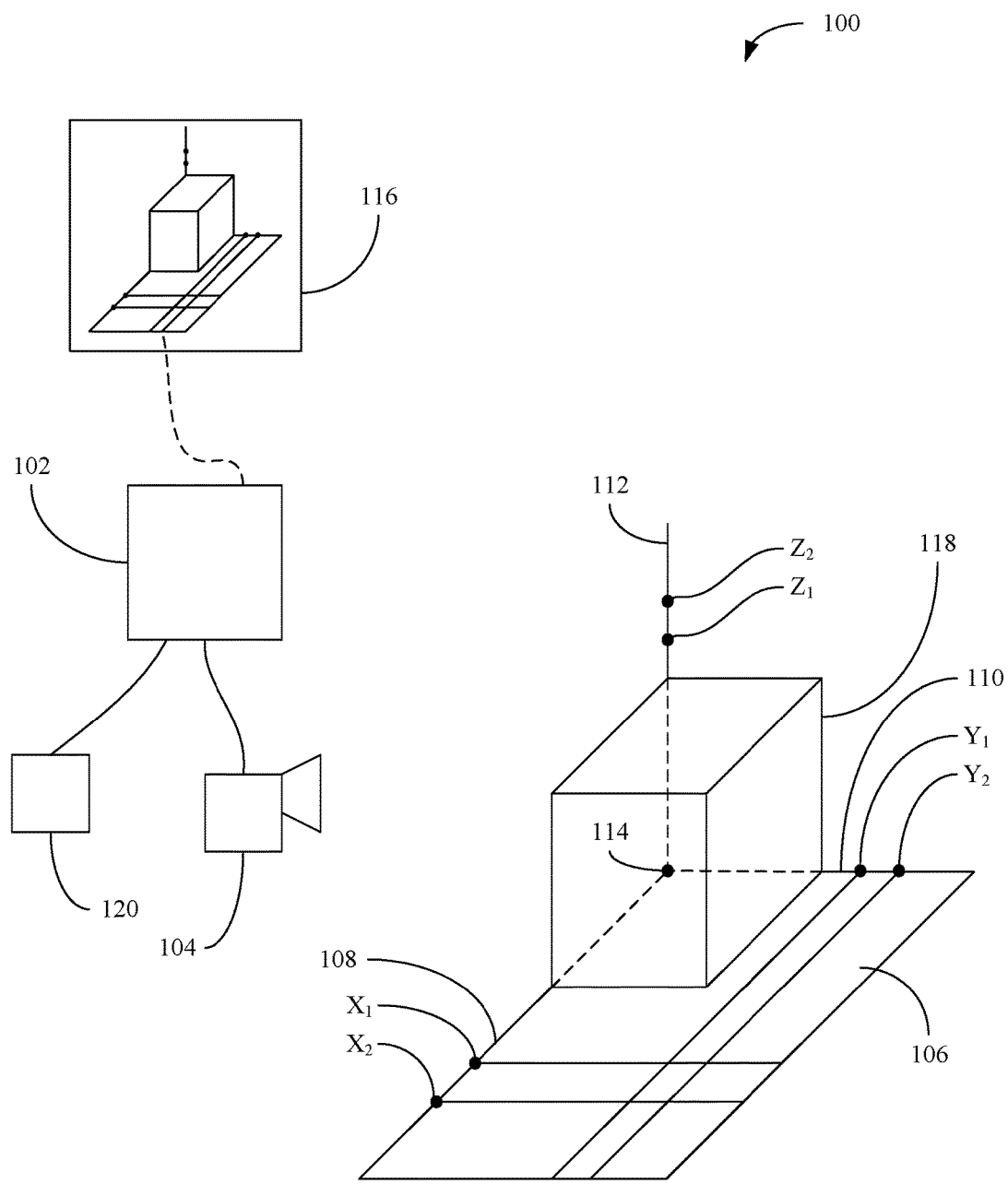
FIG. 1 shows an example system diagram for measuring package dimensions consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit the disclosure. Instead, the proper scope of any invention disclosed herein is defined by the appended claims.

Currently, when a person wants to ship a package the person has to use a ruler or tape measure to measure the package or take the package to shipping personnel working at a counter and have that person measure the package before a shipping label can be created. As disclosed herein, a self-service terminal may include a camera that allows a person to measure the package without the use of a ruler or tape measure.

The camera may capture an image of the package in a preset location and orientation. Once the image is captured, a computing device may utilize cross ratios to determine the dimensions of the package. For example, the cross-ratios may be defined by four points. On an axis, three of the four points may represent an origin and two other known points along the axis. The fourth point may mark one corner of a side of the package to be measured. The fourth point may be between the origin and the furthest marker or even beyond the furthest marker.

The four points may result in two sets of quadrupled points. For example, one set of points may be labeled as ABCD and may represent a line segment of points in the real-world. The second set of points may be labeled as A'B'C'D' and may represent the same real-world points captured in the image. As disclosed herein, A'B'C'D' may be used to calculate a cross-ratio value. One point in the ABCD set may be a fourth unknown point that marks a corner of the package. Using the cross-ratio value obtained from the image (i.e., A'B'C'D') and real-world measurement for the three known points from ABCD, the value of the fourth point can be calculated.

As disclosed herein, the systems and methods for measure the dimensions of a package offer several advantages. First, the systems and methods disclosed herein are accurate and fast. In addition, the systems and methods disclosed herein allow for a customer to determine the dimensions of his or her package without having to wait for shipping personnel to assist them.

Turning now to the figures, FIG. 1 shows an example schematic of a system 100 for measuring package dimensions consistent with embodiments disclosed herein. The system 100 may include a computing device 102, a camera 104, and a table 106. The table 106 may define a coordinate system having an x-axis 108, a y-axis 110, and a z-axis 112. Each of the axes may include one or more reference points $X_1$, $X_2$, $Y_1$, $Y_2$, $Z_1$, and $Z_2$ a known distance from an origin 114.

As disclosed herein, the camera 104 may be used to capture an image 116 of a package 118. Once the image 116 has been captured, the computing device 102 can utilize the cross-ratios as disclosed herein to determine the dimensions of the product. In addition, the computing device may extract shipping information from the product. Using the shipping information and the package dimensions, the computing device may transmit a shipping label to a printer 120.

The reference points may be used to determine the cross-ratios for the real-world points. For example, the cross-ratio for real-world distances may be defined as:

$$\frac{AC}{AD} = \frac{BC}{BD} \qquad \text{Equation 1}$$

The cross-ration for the real-world points within the image 116 may be defined as:

$$\frac{A'C'}{A'D'} = \frac{B'C'}{B'D'} \qquad \text{Equation 1}$$

As an example, the distance from the origin 114 to the various reference points may be as follows:

TABLE 1

| Point | Distance from Origin |
|---|---|
| $X_1$ | 100 mm |
| $X_2$ | 200 mm |
| $Y_1$ | 100 mm |
| $Y_2$ | 150 mm |
| $Z_1$ | 100 mm |
| $Z_2$ | 150 mm |

Within the image 116, the reference points and other calibration points may be represented as an ordered pair. The values for the ordered pair may be the pixel values. Not all of the reference points need to be defined in the image. For example, values for various reference points within the image 116 may be defined as follows:

TABLE 2

| Point | Pixel Coordinates (X, Y) |
|---|---|
| Origin | (845, 385) |
| $Y_1'$ | (898, 583) |
| $Y_2'$ | (937, 721) |
| $X_1'$ | (598, 391) |
| $X_2'$ | (351, 397) |
| $Z_1'$ | (881, 155) |
| $Z_2'$ | (904, 9) |

Also from the captured image, the pixel coordinates of the corners of the package along an axis can be obtained as follows:

TABLE 3

| Point | Pixel Coordinates (X, Y) |
|---|---|
| X-axis | (692, 389) |
| Y-axis | (875, 492) |
| Z-axis | (866, 249) |

As shown in FIG. 1, the table 106 may include additional reference points that just points along the various axes.

The distance between the various reference points in the image 116 can be found using a distance formula such as the Pythagorean Theorem. For example, using the Pythagorean Theorem, the distance between the origin 114 and point $Y_1'$ is 205 pixels, $Y_2'$ is 348 pixels, etc.

Using Equations 1 and 2 and the data in Tables 1, 2, and 3 the various dimensions of the package 118 can be calculated. For example, the dimension of the package 118 in the Y direction may be calculated as:

Let:

$$A' = \text{Origin}$$

$$B' = (875, 492)$$

$$C' = Y_1'$$

$$D' = Y_2'$$

$$AB = \text{Dimension of package in the } Y \text{ direction}$$

$$\frac{A'C'}{A'D'} : \frac{B'C'}{B'D'} = \frac{205}{348} : \frac{94}{237} = \frac{205 \times 237}{348 \times 94} = \frac{48585}{32712} = 1.485$$

$$\frac{100}{150} : \frac{100 - AB}{150 - AB} = \frac{100(150 - AB)}{150(100 - AB)} = 1.485$$

$$15000 - 100AB = 22275 - 222.75AB$$

$$122.75AB = 7275 \Rightarrow AB = 59.27 \text{ mm}$$

The above calculations can be completed for the various dimension of the package 116. The cross-ratio need not be the same for each dimension. For example, using the above equations and data shows that the cross-ratio in the X direction is 1.814 and in the Z direction is 1.568. Carrying out the calculations for the package 116 using the data in Tables 1 and 2 results in the package having dimensions of 61.95 mm×59.27 mm×63.02 mm. The real-world package used in testing had dimensions of 62 mm×62 mm×62 mm. As shown herein, the calculations to find the dimensions of the package 118 can be calculated to within about 3 mm.

Figure 2:
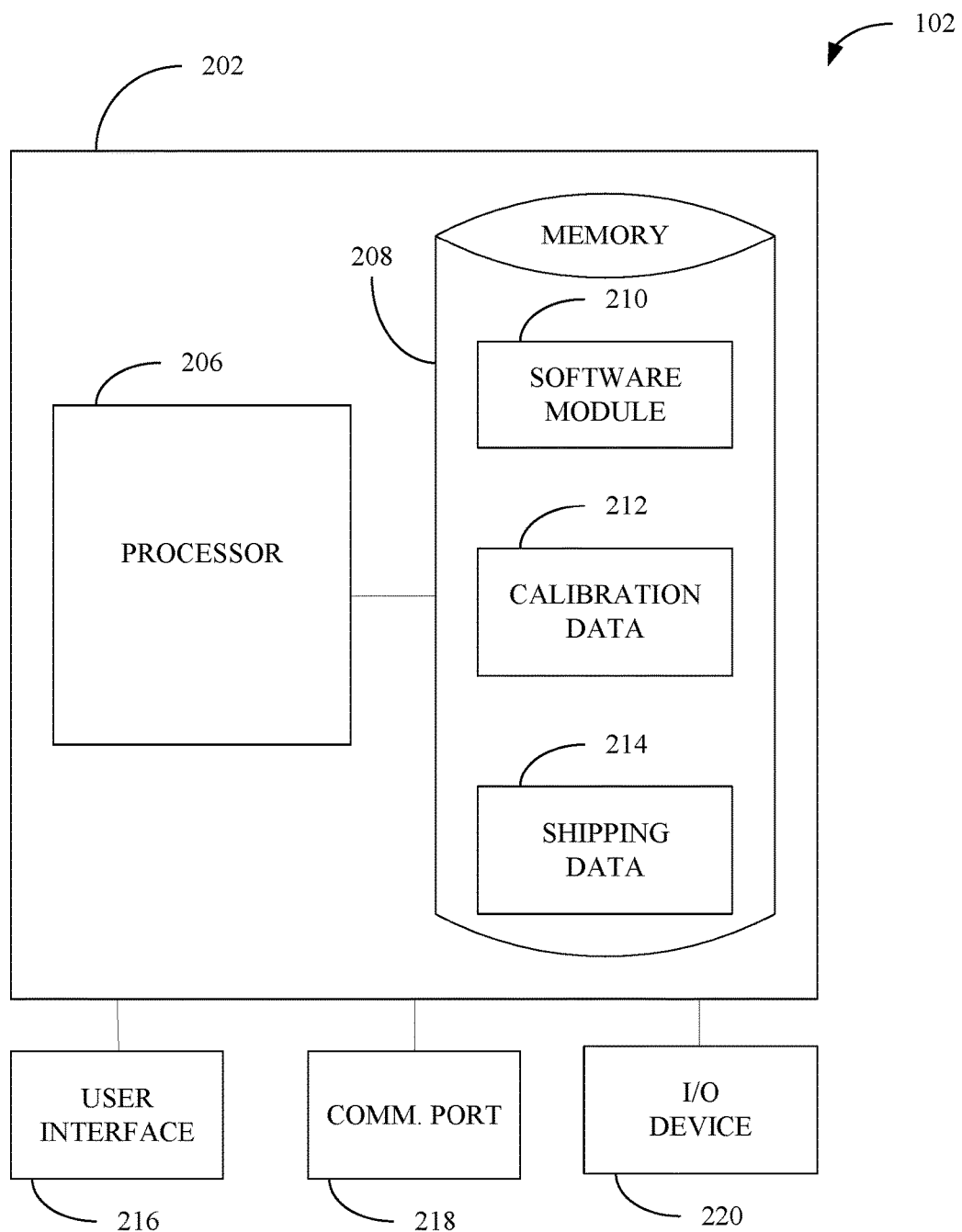
FIG. 2 shows an example computing device consistent with this disclosure.

FIG. 2 shows an example schematic of the computing device 102 consistent with embodiments disclosed herein. The computing device 102 may include a computing environment 202, which may include a processor 206 and a memory unit 208. The memory unit 208 may include a software module 210, calibration data 212, and shipping data 214. The calibration data 212 may include known distances in the real world between the reference points and the origin 114, angle of the camera 104 in relation to the table 106, an image of the table without the package 118, etc. The shipping data 214 may include shipping rates for various size packages and distance to be shipped, etc. While executing on the processor 206, the software module 210, the calibration data 112, and the shipping data 214 may perform processes for measuring the dimensions of packages, including, for example, one or more stages included in a method 300 described below with respect to FIG. 3.

The computing device 102 may also include a user interface 216. The user interface 216 may include any number of devices that allow a user to interface with the computing device 102. Non-limiting examples of the user interface 216 may include a keypad, a microphone, a speaker, a display (touchscreen or otherwise), etc.

The computing device 102 may also include a communications port 218. The communications port 218 may allow the computing device 102 to communicate with information systems such as those operated and maintained by a shipping company, etc. Non-limiting examples of the communications port 218 may include, Ethernet cards (wireless or wired), Bluetooth® transmitters and receivers, near-field communications modules, cellular modules, etc.

The computing device 102 may also include an input/output (I/O) device 220. The I/O device 220 may allow the computing device 102 to receive and output information. Non-limiting examples of the I/O device 220 may include, a camera (still or video, such as the camera 104), a printer (such as the printer 120), a scanner, a scale, etc.

Figure 3:
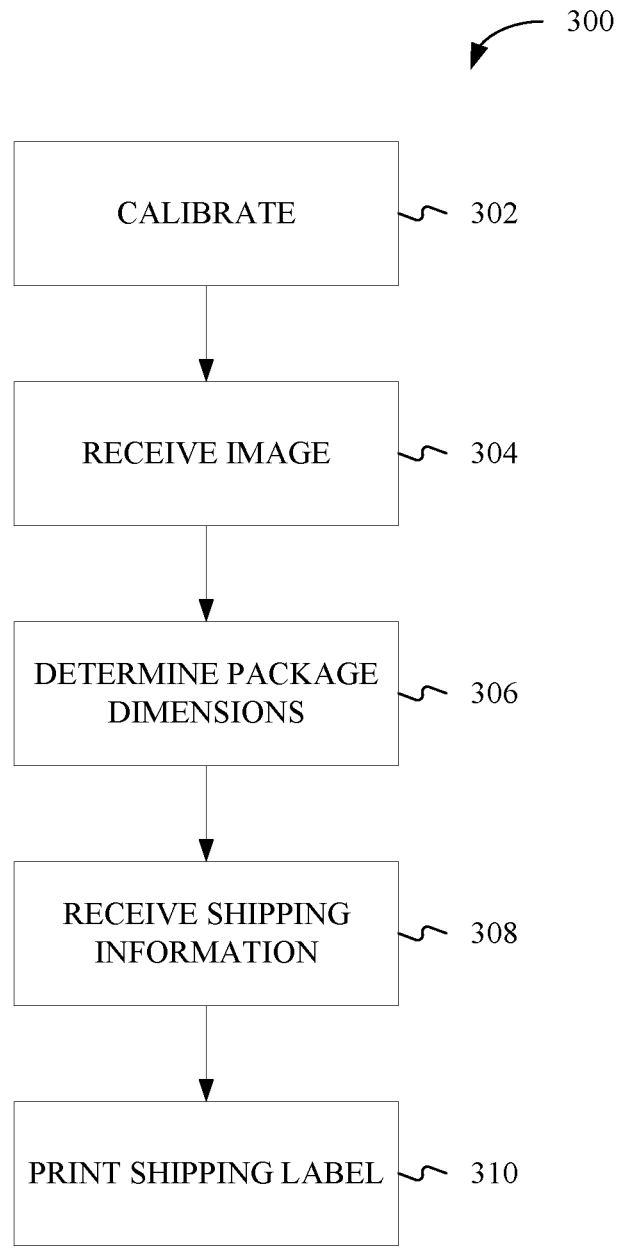
FIG. 3 shows a method consistent with this disclosure.

FIG. 3 shows a method 300 for measuring dimensions of a package consistent with this disclosure. The method 300 may begin at stage 302 where the system 100 may be calibrated. For example, and as discussed herein, the system 100 may need to be calibrated so that reference points in the real-world can be matched to points within the image 116 in order to calculate the cross-ratios. The calibration need not be performed every time the dimensions of a package are to be measured. For instance, the calibration may be performed every morning when the shipping facility opens or anytime maintenance is performed on the system 100.

From stage 302 the method 300 may proceed to stage 304 where an image may be received. For example, as disclosed herein, the camera 104 may be used to capture the image 116, which may be received at the computing device 102. As disclosed herein the image may include the table 106 and the package 118. Also, as disclosed herein some or all the reference points may or may not be visible in the image.

From stage 304 the method 300 may proceed to stage 306 where the dimensions of the package may be determined. For example, as detailed herein, the cross-ratios for the x-axis, y-axis, and z-axis may be used to determine the length, width, and height of the package along the respective axes. In addition, determining the package dimensions may include identifying the corners of the package within the image 116. For example, image analysis may be performed to identify the package 118 from the background of the image 116. For instance, an image of the background without the package 118 may be compared to the image 116 and any differences may represent the package.

The image analysis may also be used when the package 118 has a wrapping paper or other exterior that is non-uniform. For instance, the package 118 may include a wrapping paper that has a design that makes identification of the corners difficult. The package 118 may also have an exterior color that is similar to that of the table. The image analysis may use a picture of the table 118 without the package 118 as a standard and differences between the standard image and image 116 can be used to identify the package 118 and corners of the package 118.

From stage 306 the method 300 may proceed to stage 308 where shipping information may be received. The shipping information may be obtained from the image 116. For example, during the image analysis the shipping address and other information may be obtained from text written on the package 118. For instance, any text on the package 118 can be OCRed to determine if the text is an address or other shipping information. For example, the text can be compared to a database of addresses, zip codes, etc. to determine if the text may be part of an address. In addition, a user may enter the shipping information via the user interface 216.

From stage 308 the method 300 may proceed to stage 310 where a shipping label may be printed. For example, after the dimensions of the package 118 are determined and the shipping information received, the computing device 102 may determine a shipping rate and transmit a shipping label to the printer 120.

Figure 4:
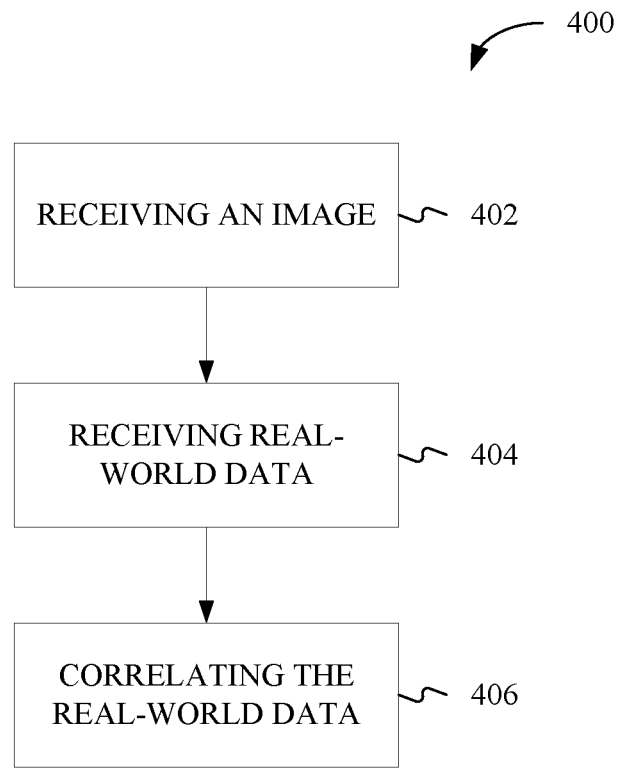
FIG. 4 shows a method consistent with this disclosure.

FIG. 4 shows a method 400 for calibrating a package dimensioning system consistent with this disclosure. The method 400 may begin at stage 402 where an image may be received at the computing device 102. The image may be image 116 without the package 118. In the image, there may be displayed the table 106 and the various reference points. In addition, the image may be captured at an angle relative to the table 106 such that when the image 116 is captured, the package 118 is arranged at an angle such that three sides (i.e., two side panels and the top) of the package 118 are visible in the image 116.

From stage 402 the method 400 may proceed to stage 404 where real-world data may be received. For example, the real-world data may be the distances from the origin 114 to the various reference points. In addition, the real-world data may include the angle at which the camera 104 is arranged relative to the table 106.

From stage 404 the method 400 may proceed to stage 406 where the real-world data may be correlated to the data in the image. For example, the reference points may be located along an axis of the real-world coordinate system shown in the image. As disclosed herein, the reference points may be a known distance from the origin in the real-world. The reference points and the origin may also have a pixel location within the image. The distance, in pixels, that the various reference points are from the origin can be determined using the Pythagorean Theorem as disclosed herein. Once the pixel distance is determined, the pixel distance can be correlated to a real-world distance. The correlation between pixel distances and real-world distances can be made for each of the x-axis, y-axis, and z-axis. By knowing the pixel distances and real-world distances for each of the reference points, the various cross-ratios used in determining a packages dimensions can be determined and used as disclosed herein.

EXAMPLES

Example 1 is a method of determining package dimensions, the method comprising: determining, by a computing device comprising a processor, pixel locations of a plurality of corners of a package within an image; and determining, by the computing device, the package dimensions based on the pixel locations.

In Example 2, the subject matter of Example 1 optionally includes receiving shipping information for the package; and printing a shipping label, the shipping label including a shipping cost based on the package dimensions.

In Example 3, the subject matter of Example 2 optionally includes wherein receiving the shipping information includes extracting the shipping information from the image.

In Example 4, the subject matter of any one or more of Examples 1-3 optionally include calibrating a reference coordinate system in the image to a real-world coordinate system.

In Example 5, the subject matter of Example 4 optionally includes wherein calibrating the reference coordinate system includes determining a pixel coordinate for a known point within the reference coordinate system, the known point being a known distance from an origin of both the reference coordinate system and the real-world coordinate system.

In Example 6, the subject matter of Example 5 optionally includes wherein the pixel coordinate corresponds to one of an x-axis, a y-axis, or a z-axis.

In Example 7, the subject matter of any one or more of Examples 1-6 optionally include capturing the image using an optical device.

In Example 8, the subject matter of any one or more of Examples 1-7 optionally include wherein determining the package dimensions includes using the pixel locations and real-world cross ratios to determine the package dimensions.

Example 9 is a measuring system comprising: a camera; a processor in electrical communication with the camera; and a memory storing instructions that, when executed by the processor, cause the processor to: receive, from the camera, an image including a coordinate system and a package, the package having a plurality of dimensions, determine pixel locations of a plurality of corners of the package within the image, and determine the plurality of dimensions of the package based on the pixel locations.

In Example 10, the subject matter of Example 9 optionally includes wherein the instructions further cause the processor to: receive shipping information for the package; and transmit a shipping label to a printer, the shipping label including a shipping cost based on the package dimensions.

In Example 11, the subject matter of any one or more of Examples 9-10 optionally include wherein receiving the shipping information includes extracting the shipping information from the image.

In Example 12, the subject matter of any one or more of Examples 9-11 optionally include wherein the instructions further cause the processor to calibrate a reference coordinate system in the image to a real-world coordinate system.

In Example 13, the subject matter of Example 12 optionally includes wherein calibrating the reference coordinate system includes determining a pixel coordinate for a known point within the reference coordinate system, the known point being a known distance from an origin of both the reference coordinate system and the real-world coordinate system.

In Example 14, the subject matter of Example 13 optionally includes wherein the pixel coordinate corresponds to one of an x-axis, a y-axis, or a z-axis.

Example 15 is a method for calibrating a package dimensioning system, the method comprising: receiving, via a camera in electrical communication with a computing device, an image of a real-world coordinate system; receiving, by the computing device, a real-world distance from an origin of the real-world coordinate system to a real-world reference point along an axis of the real-world coordinate system; and correlating, by the computing device, the real-world distance to an image distance.

In Example 16, the subject matter of Example 15 optionally includes wherein the image distance is measured in pixels.

In Example 17, the subject matter of any one or more of Examples 15-16 optionally include wherein the origin of the real-world coordinate system has an origin pixel location in the image, the origin pixel location defined as an origin ordered pair.

In Example 18, the subject matter of any one or more of Examples 15-17 optionally include wherein the real-world reference point has a reference point pixel location in the image, the reference point pixel location defined as a reference point ordered pair.

In Example 19, the subject matter of any one or more of Examples 15-18 optionally include wherein correlating the real-world distance to the image distance includes: determining a pixel distance, within the image, from an origin pixel location to a reference point pixel location; and equating the pixel distance to the real-world distance.

In Example 20, the subject matter of any one or more of Examples 15-19 optionally include wherein the axis of the real-world includes an x-axis, a y-axis, or a z-axis.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method of determining package dimensions, the method comprising:
   determining, by a computing device comprising a processor, pixel locations of a plurality of corners of a package within an image; and
   determining, by the computing device, the package dimensions based on the pixel locations, including determining image distances in pixels between pixel coordinates defining the pixel locations and using the image distances and real-world cross ratios to determine the package dimensions, the cross ratios defined by four points, three of the four points representing an origin and two other known points along an axis, a fourth of the four points marking a corner of a side of the package.

2. The method of claim 1, further comprising:
   receiving shipping information for the package; and
   printing a shipping label, the shipping label including a shipping cost based on the package dimensions.

3. The method of claim 2, wherein receiving the shipping information includes extracting the shipping information from the image.

4. The method of claim 1, further comprising calibrating a reference coordinate system in the image to a real-world coordinate system.

5. The method of claim 4, wherein calibrating the reference coordinate system includes determining a pixel coordinate for a known point within the reference coordinate system, the known point being a known distance from an origin of both the reference coordinate system and the real-world coordinate system.

6. The method of claim 5, wherein the pixel coordinate corresponds to one of an x-axis, a y-axis, or a z-axis.

7. The method of claim 1, further comprising capturing the image using an optical device.

8. A measuring system comprising:
   a camera;
   a processor in electrical communication with the camera; and
   a memory storing instructions that, when executed by the processor, cause the processor to:
   receive, from the camera, an image including a coordinate system and a package, the package having a plurality of dimensions,
   determine pixel locations of a plurality of corners of the package within the image, and
   determine the plurality of dimensions of the package based on the pixel locations, including determining image distances in pixels between pixel coordinates defining the pixel locations and using the image distances and real-world cross ratios to determine the package dimensions, the cross ratios defined by four points, three of the four points representing an origin and two other known points along an axis, a fourth of the four points marking a corner of a side of the package.

9. The measuring system of claim 8, wherein the instructions further cause the processor to:
   receive shipping information for the package; and
   transmit a shipping label to a printer, the shipping label including a shipping cost based on the package dimensions.

10. The measuring system of claim 8, wherein receiving the shipping information includes extracting the shipping information from the image.

11. The measuring system of claim 8, wherein the instructions further cause the processor to calibrate a reference coordinate system in the image to a real-world coordinate system.

12. The measuring system of claim 11, wherein calibrating the reference coordinate system includes determining a pixel coordinate for a known point within the reference coordinate system, the known point being a known distance from an origin of both the reference coordinate system and the real-world coordinate system.

13. The measuring system of claim 12, wherein the pixel coordinate corresponds to one of an x-axis, a y-axis, or a z-axis.

* * * * *